United States Patent
Pereira et al.

[11] Patent Number: 6,154,689
[45] Date of Patent: Nov. 28, 2000

[54] MULTIMEDIA COMPUTER EQUIPMENT FOR AUTOMATIC TRANSMISSION OF MULTIMEDIA ENTERTAINMENT PROGRAMS

[75] Inventors: Eddy Pereira, Pont de Claix; Nicolas Gaudard, Herouville St-Clair; Francis Piot, Offemont, all of France

[73] Assignee: Integral Media S.A., Belfort, France

[21] Appl. No.: 09/101,127

[22] PCT Filed: Jan. 2, 1997

[86] PCT No.: PCT/FR97/00008

§ 371 Date: Jun. 30, 1998

§ 102(e) Date: Jun. 30, 1998

[87] PCT Pub. No.: WO97/24581

PCT Pub. Date: Jul. 10, 1997

[30] Foreign Application Priority Data

Jan. 2, 1996 [FR] France .................................. 96 00106

[51] Int. Cl.[7] ............................ G01C 21/20; G09B 29/10
[52] U.S. Cl. ................................ 701/1; 701/211; 340/993
[58] Field of Search ............................... 701/201, 1, 211, 701/213; 340/993, 995

[56] References Cited

U.S. PATENT DOCUMENTS

| | | | |
|---|---|---|---|
| 4,954,959 | 9/1990 | Moroto et al. | 701/200 |
| 5,185,857 | 2/1993 | Rozmanith et al. | 395/148 |
| 5,614,895 | 3/1997 | Ohomori et al. | 340/995 |
| 5,614,898 | 3/1997 | Kamiya et al. | 340/995 |
| 5,648,768 | 7/1997 | Bouve | 340/988 |
| 5,794,164 | 8/1998 | Beckert et al. | 701/1 |

FOREIGN PATENT DOCUMENTS

| | | |
|---|---|---|
| 0 672 890 A1 | 9/1995 | European Pat. Off. . |
| 07225897 | 8/1995 | Japan . |
| WO 93/20546 | 10/1993 | WIPO . |

Primary Examiner—Tan Nguyen
Attorney, Agent, or Firm—Davis and Bujold

[57] ABSTRACT

This invention relates to multimedia computer equipment for automatic transmission of multimedia entertainment programmes, for example travel information for trips in motor vehicles. The equipment (1) comprises a fixed computer terminal installed, for example, in a travel agency (11), an on-board computer terminal (50) installed in the motor vehicle (51), facilities for transmission (100) of parameters relating to a trip, facilities for storage (150) of the multimedia programmes for transmission and facilities for locating (200) the vehicle using the global positioning system known as GPS receivers (201) incorporated in the vehicle. The locating facilities (200) are set up to communicate with the on-board computer terminal (50) in such a way as to transmit appropriate multimedia programmes contained in the storage facilities (150) as a function of the parameters of the trip, the vehicle's geographical location and/or the hour and/or date. Applications: All applications in which specific multimedia programmes can usefully be transmitted as a function of a given situation: for example, travel, sports, leisure activities, visits to industrial or public installations.

15 Claims, 4 Drawing Sheets

MULTIMEDIA COMPUTER EQUIPMENT FOR AUTOMATIC TRANSMISSION OF MULTIMEDIA ENTERTAINMENT PROGRAMS

This invention concerns multimedia information technology equipment for the automatic distribution of multimedia animated sequences depending on a geographical position, time and/or date on board a vehicle, for example, distribution of tourism multimedia animated sequences during a journey shown on board the vehicle, the equipment including as a minimum, one IT station on board the vehicle, with a means of storing the multimedia animated sequences, at least one unit for managing the multimedia animated sequences, at least one unit for distribution of the multimedia animated sequences, this equipment incorporating an on-board GPS receiver in the vehicle equipped to supply continuous geographical data on the position of the vehicle and/or at least, time detection equipment incorporating a clock equipped to supply continuous time data, such geographical and/or time data being processed to ensure communication with the control unit so as to distribute appropriate multimedia animated sequences depending on the geographical position of the vehicle or depending on the time and/or date, the animated sequence distribution unit being linked to at least one television screen and at least one loudspeaker installed in the vehicle.

BACKGROUND OF THE INVENTION

During journeys in such a vehicle, a coach or a boat etc., and in particular, tourist excursions, the passengers or tourists frequently do not receive adequate information at the optimum time and the information they do receive is not necessarily what they would like. Take the typical example of coach trips. Very few travel agencies have the services of a guide to give a commentary on the regions, towns or sites visited during the entire journey, suited to the type of passengers in terms of their language, age and reasons for taking part in the trip. Even though a guide has the advantage of being able to answer questions and facilitate relationships, this represents a substantial cost for the travel agencies and the guide's skills are necessarily limited. In addition, a guide can only comment on the towns or monuments, without illustrating them. On the other hand, coaches are normally equipped with videos to show films to entertain the passengers and a radio to create an ambience. If the video player is used to illustrate the sites visited, the driver must intervene to start it up. The cassette is not necessarily started at the opportune time. In addition, the selection of cassettes for each region is limited —as is the range of languages and content. Furthermore, this solution is not directly interactive with the travel agency and the coach route.

There exist on-board computer systems generally comprising portable computers with extension cards to allow connection via a modem to the phone network, used in particular, as office or remote management or data acquisition tools. Computer systems with global positioning systems, known as GPS, are generally used in the context of traffic prediction or radio guidance systems.

The European document EP-A-0 672 890 describes an on-board IT station for a bus, equipped with a GPS type location system. This station can store data, distribute it and trigger distribution of the data either manually or automatically depending on the GPS data. There is no resource which allows parametering a journey and selecting the type of information to be distributed depending on the type of audience or on a specific topic. The automatic mode takes into account solely the geographical position supplied by the GPS.

The Japanese document JP-A-07 225 897 describes a device for communication between a static IT station and a mobile IT station on-board a vehicle. The two stations are constantly in communication to ensure transmission of the data to be distributed from the static station to the mobile station depending on the position of the vehicle detected by a GPS type location system. The mobile station is not designed to operate in stand-alone mode. In addition, the transmission of data by radio does not allow distribution of all types of information such as video films, on account of the limited transmission speed. Nor does this device incorporate any means of parametering the journey and selecting the information to be distributed.

SUMMARY OF THE INVENTION

The purpose of the invention is to provide a new user-friendly solution for tourism and transport professionals as well as for passengers to make journeys more interesting and attractive, by offering interactive multimedia IT facilities for professionals and which interact with the route followed by the vehicle, with a view to ensuring the automatic distribution, without any intervention by the driver, of multimedia animated sequences covering tourism, culture, the economy, geography, history and other aspects of a town, a site, a monument, a region or a population, etc., depending on the actual geographical position of the vehicle and/or a time and/or date. The multimedia sequences distributed could easily be targeted depending on the wishes and interests of the tourists, their age group and language.

Multimedia animations are those incorporating four types of data: text, sound, images and computer data. The animated sequences contain sound and graphics in the form of digital format video films or virtual sequences, in two or three dimensions. The multimedia format allows accessing on request, the four types of data referred to above in interactive manner, that is by incorporating them either individually or simultaneously. By incorporating them simultaneously, any combination of the four types of data is possible.

Another purpose of the invention is to allow tourism professionals to use the equipment to create and distribute customised messages to promote their services, future trips and welcome messages or messages concerning the day's events, the gastronomic menus proposed etc. The equipment proposed also allows parametering the excursion directly from the agency by selecting the multimedia animated sequences and customised messages to be distributed and will offer the option of displaying on site, the itinerary and places of interest visited, etc.

These objectives will be achieved by means of the equipment described in the preamble, characterised by the fact that the on-board station incorporates resources for storing the journey parameters and a unit for management of these parameters and by the fact that the journey parameter management unit communicates with the animated sequences management unit such as to generate transmission of the animated sequences depending on the journey parameters.

The on-board station has the advantage of a memory for storing the database of animated sequence and journey parameters retrieved from the corresponding storage facility.

In the preferred format for implementation of the invention, the equipment includes a static IT station incorporating at least, resources for storing the multimedia animated sequences, at least one unit for selection of the multimedia animated sequences and at least one unit for parametering the journey, and resources for transmitting data to the on-board IT station.

Preferably the static and on-board IT stations will include a multimedia computer equipped at least with an optical reader and resources for storing multimedia animated sequences (150) including at least a CD ROM (151) with at least one multimedia database corresponding to the animated sequences to be distributed.

Advantageously, the unit for selection of the multimedia animated sequences would be equipped to enable selection of the animated sequences to be distributed from the storage resources for the multimedia animated sequences depending on the selected journey itinerary and the audience and/or a specific topic.

Also, the unit for parametering the journey is equipped to define the journey parameters, these parameters including at least one itinerary associated with the multimedia animated sequences selected from the selection unit and the time data.

In the preferred implementation format, the static IT station would incorporate the unit for creation of customised messages, such customised messages being linked to the parametering unit and transmitted to the on-board IT station by the said transmission resources, the on-board IT station including a unit for management of the customised messages.

Preferably, the customised message management unit is equipped to generate the sending of customised messages to the unit for the distribution of the animated sequences depending on the geographical and/or time data and depending on the journey parameters.

The static IT station could include at least one journey test unit equipped to display the selected journey parameters and to display the corresponding animated sequences.

The static IT station could also include libraries to store respectively, the itineraries created by the animated sequence selection unit, the journeys created by the parametering unit and the customised messages created by the message creation unit.

Advantageously the animated sequence management unit and customised messages management unit would be equipped to find animated sequences and/or the messages to be distributed, depending on an order of priority defined in the journey parameters.

The animated sequence management unit could be equipped to generate sending a waiting sequence if the geographical data supplied by the GPS receiver did not change during the period of time defined in the journey parameters.

The transmission resources would advantageously include a diskette and the fixed and on-board IT stations would include a disk drive.

These transmission resources could include a radio transmitter and in this case the on-board IT station would incorporate a radio receiver. Or, the transmission resources could include a telephone modem and in this case, the on-board IT station would include an equivalent modem.

BRIEF DESCRIPTION OF THE DRAWINGS

This invention and its advantages are better illustrated in the following description of a non-exhaustive example of the implementation, with reference to the annexed drawings where.

DESCRIPTION OF THE PREFERRED EMBODIMENT(S)

Figure 1:
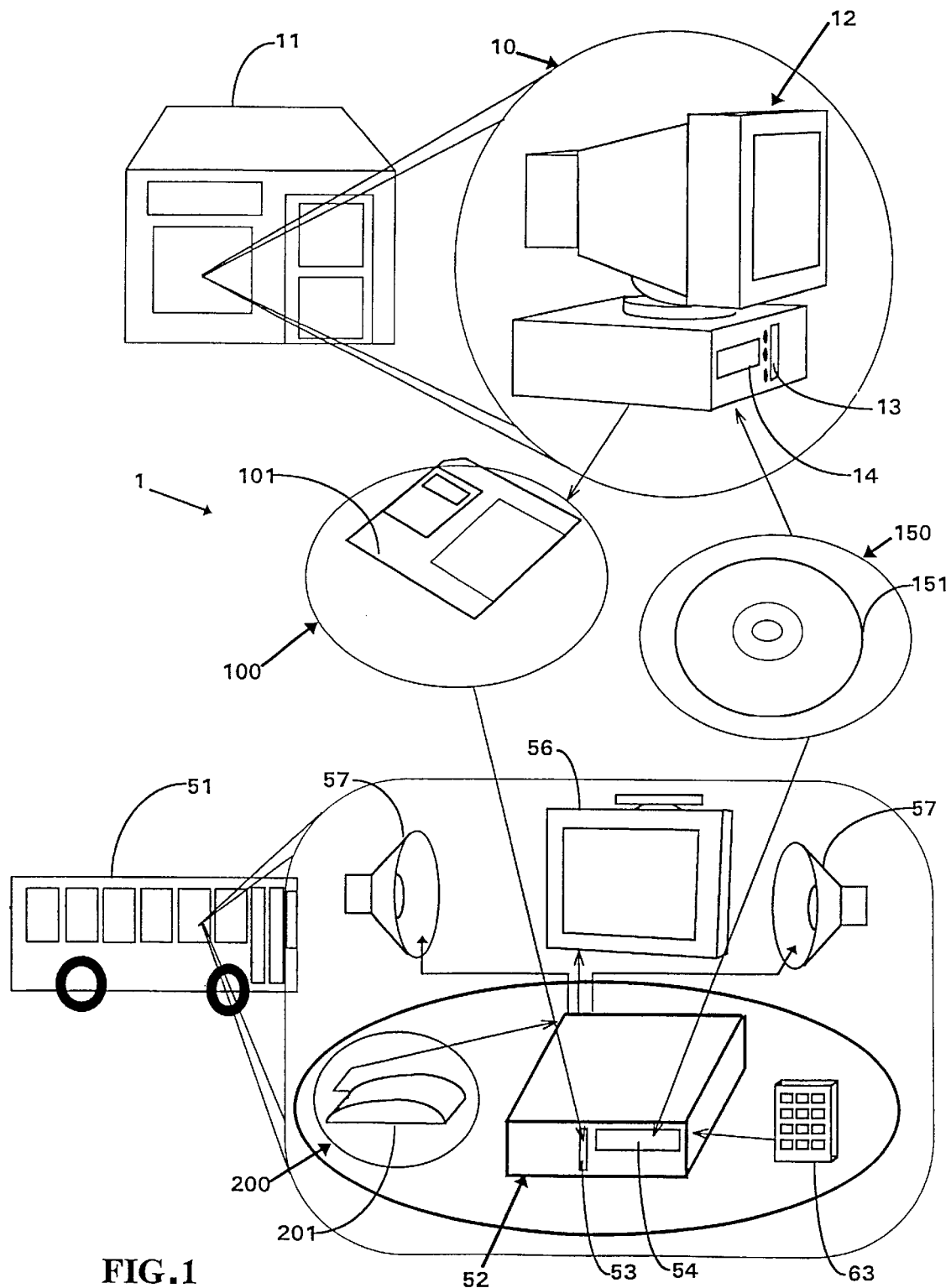
FIG. 1 represents a complete unit in accordance with the invention used for a tourist journey in a coach

With reference to FIG. 1, the full equipment 1, called in this case "MEDIABUS" (registered trade mark) and corresponding to a preferred variant of the invention incorporates a static IT station 10 installed for example in a travel agency 11, an on-board IT station 50 installed for example inside a tourist coach 51, data transmission resources 100 corresponding to data concerning a journey, resources for storage of the multimedia animated sequences to be distributed 150 and resources for location 200 of the vehicle 51 using a global positioning system called the GPS receiver 201, fitted in the said vehicle 51.

Figure 2:
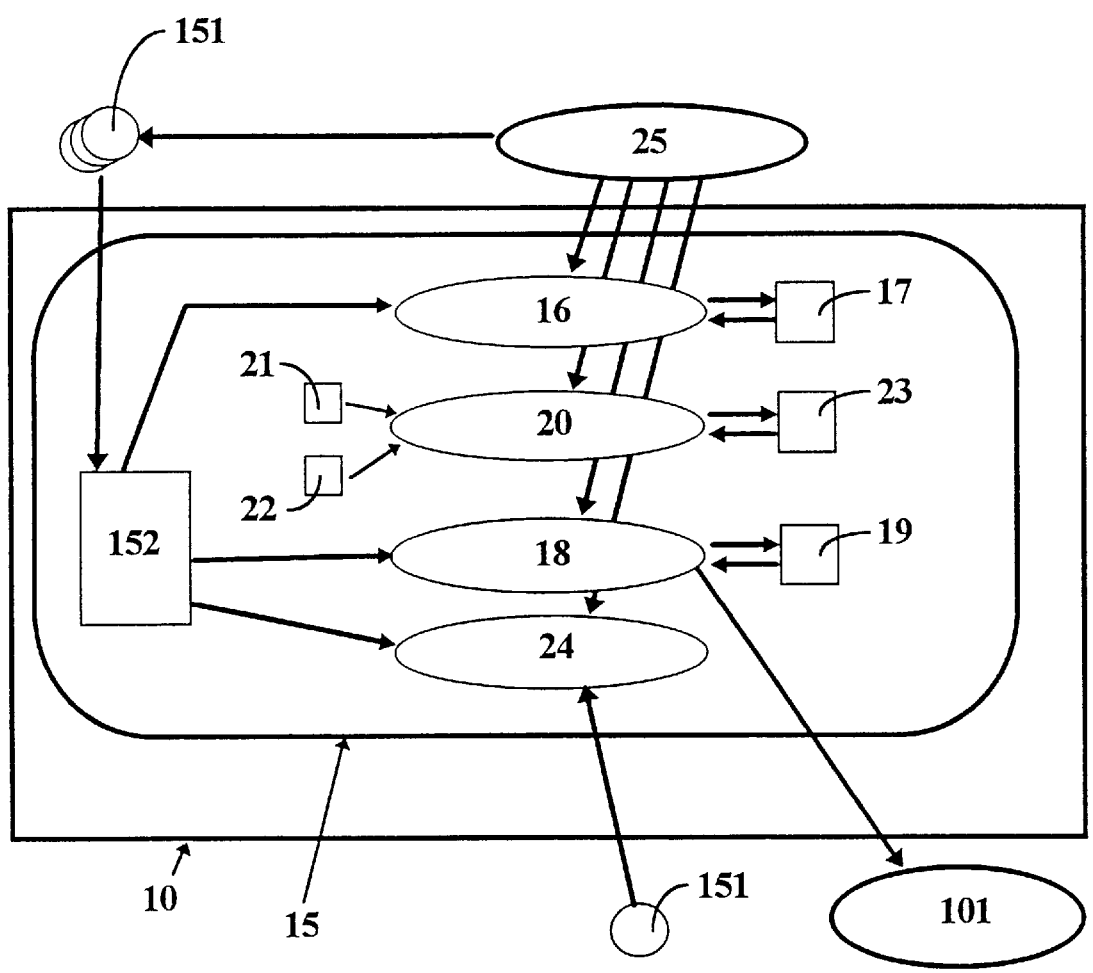
FIG. 2 represents an outline diagram of the static IT station included in the equipment illustrated in FIG. 1

With reference to FIGS. 1 and 2, the static station 10 includes a multimedia type computer 12 equipped with a disk drive 13 and CD ROM 14 optical disk (CD ROM=read only compact disk). This station is equipped to allow the creation and definition of a journey by the personnel 25 in the agency, by storing data concerning the journey in digital form on a storage medium such as diskettes 101, optical read only CD ROM's called "CD ROM", etc., for transmission to the on-board IT station 50 using the data transmission resources 100. This information concerns for example, the journey itinerary, the towns and sites visited, the multimedia animated sequences to be distributed during the journey, concerning, in particular tourism information of various types: geographical, historical, economic, sociological, gastronomic, etc., the customised messages and the journey parameters. These multimedia animated sequences are selected from the multimedia animated sequence storage resources to be distributed 150 constituted of at least one CD ROM 151 and containing at least one multimedia data base.

With the objective defined above, the computer 12 in the static IT station 10 is equipped with a specific module called the "journey generator" 15 which incorporates at least one selection unit 16 for the said multimedia animated sequences depending on the journey itinerary defined. Each itinerary defined can be stored in memory in an itinerary library 17. The journey generator 15 also includes a customised message creation unit 20, to compose for example, welcome messages, the day's programme, the menus, but also advertising messages for the travel agency 11, for the services of the coach company, for local traders so they can present regional products, promotional messages for future excursions, presentation of the Conseil Général, etc. These customised messages could be illustrated and enhanced by an image or video sequence selected from the images library 21 and/or a logo selected from a logos library 22. These could then be stored in a customised messages library 23. Of course, other data libraries could be provided for depending on the specific application of the invention. The journey generator 15 also includes a journey parametering unit 18 which allows selecting am itinerary with the arrival and departure points, the customised messages and all other data relative to the journey. Each paramatered journey can be memorised in a journey library 19. The journey generator 15 would also include a test unit 24 allowing testing the contents of a selected journey by displaying the parameters, the itinerary, the sites and towns visited, the multimedia animated sequences selected from the multimedia database and the customised messages. The journey selected is then copied onto diskette 101 called the journey diskette, which is used to transmit the contents of the journey to the on-board IT station 50.

The data transmission resources 100 can of course, be replaced by radio transmission using a radio transmitter and receiver or by telephone transmission using a modem. In both cases, the distribution of information can be in both directions, that is, also from the on-board station 50 to the static station 10 to transmit, for example, breakdown or other messages.

Figure 3:
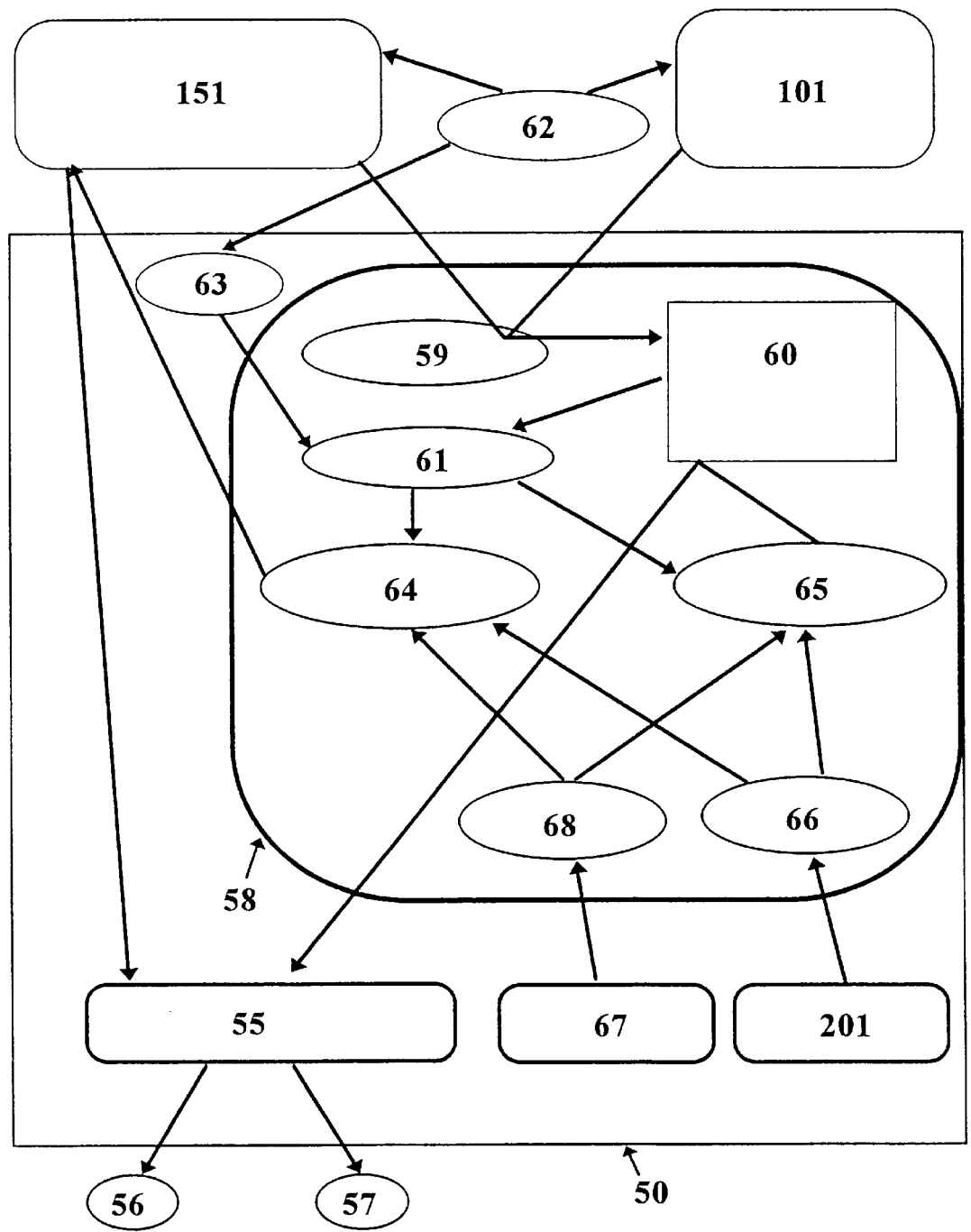
FIG. 3 represents an outline diagram of the on-board IT station included in the equipment illustrated in FIG. 1.

With reference to FIGS. 1 and 3, the on-board station 50 incorporates a multimedia computer 52 with a disk drive 53 and a CD ROM drive 54. The on-board station 50 is loaded with the journey diskette 101 and at lease one CD ROM 151 containing at least one multimedia database corresponding to the journey diskette 101. It is programmed to distribute the multimedia animated sequences on at least one distribution resource 55, coupled to at least one TV screen 56 and at least one loudspeaker 57 installed in the vehicle 51. The distribution of the multimedia animated sequences is closely linked to the geographical position of the vehicle 51 in relation to a selected route and/or a specific time and/or a specific date. For this purpose, the on-board station 50 incorporates a module called the "journey manager" 58 which incorporates at lease one start up unit 59 to load into the memory 60, the contents of the diskette 101 and the CD ROM 151. The journey manager 58 also incorporates at least one unit for management of the journey parameters 61 such as the itinerary, the operating time range, the language in which the multimedia animated sequences will be distributed, and also, the interventions of the driver 62 by means of a keyboard 63. The journey manager 58 also incorporates at least on unit for management of the animated sequences 64 linked to the CD ROM 151 and at least one unit for management of customised messages 65 in conjunction with the diskette 101. The two units 64, 65 send the multimedia animated sequences and the customised messages to the distribution unit 55. They are permanently connected to a unit for management of the GPS data 66 which continuously receives data from the GPS receiver 201 which allows accurately locating the vehicle 51, and to the internal clock of the on-board IT station 50.

Figure 4:
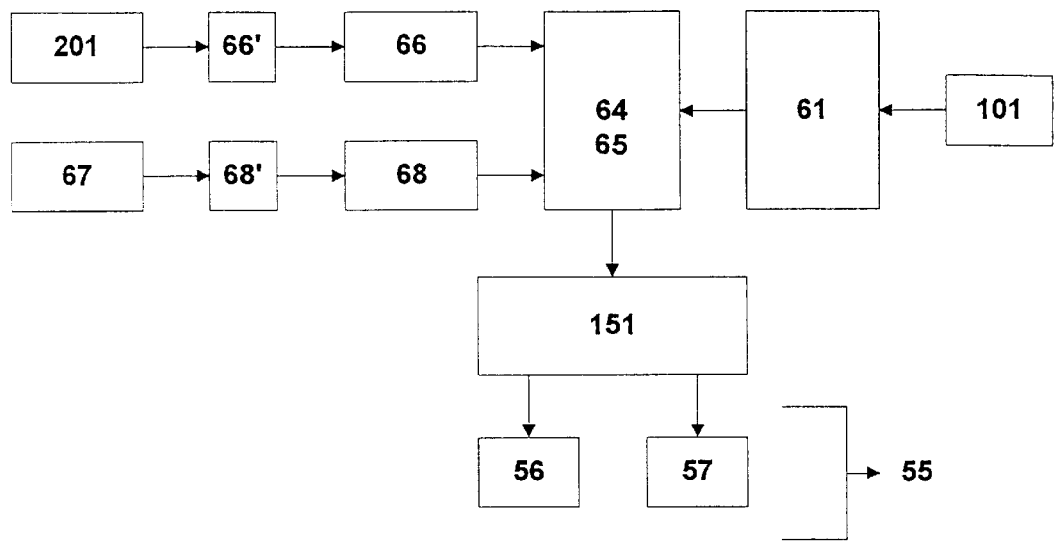
FIG. 4 represents an outline diagram of the principle resources used in the on-board IT station and FIG. 5 represents an example of the breakdown of the geographical active zones linked to the multimedia animated sequences.

FIG. 4 illustrates in simple format the main resources used in the on-board station 50. This includes the GPS receiver 201 and the internal clock 67 of the IT station which periodically supply the geographical and time data. This data is formatted in the formatting unit 66', 68' and then transmitted to the management units for geographical data 66 and time data 68 which communicate with the animated sequence management unit 64 for the customised messages 65. The management unit 64 generates transmission of the CD ROM 151 animated sequences to the distribution unit 55 depending on the geographical data. The management unit 65 generates the customised messages and sends them to the distribution unit 55 depending on the geographical and/or time data In parallel, the parametering unit 61, supplied by the journey diskette 101, which contains the journey parameters, communicates with the animated sequence management unit 64 and allows it to select the animated sequences and the customised messages to be sent, depending on the parameters defined. Thanks to this configuration, only the animated sequences and the messages selected and parametered are distributed.

In the entire text of this application, the words "module" and "unit" designate specific computer programs of which the functional flow charts are shown and detailed below. But first of all, various terms used in the flow charts are defined below:

"zone of influence" means a set of points defined by their geographical co-ordinates (latitude and longitude) linked to a site. Each site stored in the database of multimedia animated sequences 151 is linked to one or more zones of influence. The zones of influence are arranged such as to cover the zones through which the vehicle equipped with the Mediabus® facilities will travel. The entry of the vehicle to one of the zones of influence causes transmission by the animated sequence management unit 64 of the sequence for the site in question to the distribution unit 55 and can in parallel disable all the zones of influence linked to the site to avoid any repeat distribution of the sequence.

a "real point" is a geographical point linked to a site, this point being located in the geographical zone of the site and which allows, during distribution of the sequence for the site concerned, displaying on screen whether the site presented is on the left or right hand side of the vehicle.

"site" means an actual location, such as a town, a village, etc. A site may incorporate "sub-sites" which are precise locations in the site such as a historical monument, a square, a district etc. A site may be presented in global or detailed manner. A "site", may also indicate a topic specific to a region, a department, a country or other. A topic may be linked to one or more zones of influence or possibly, a real point.

"global presentation" of a site means a multimedia animated sequence presenting the major features of the site in question (historical, economic aspects etc.). A global presentation may be linked to one or more zones of influence and possibly, a real point "detailed presentation" of a site means a set of multimedia animated sequences concerning sub-sites in the site in question.

"approach" means a zone of influence incorporating the zones of influence for all the sub-sites in the site concerned, and possibly, a real point.

Figure 5:
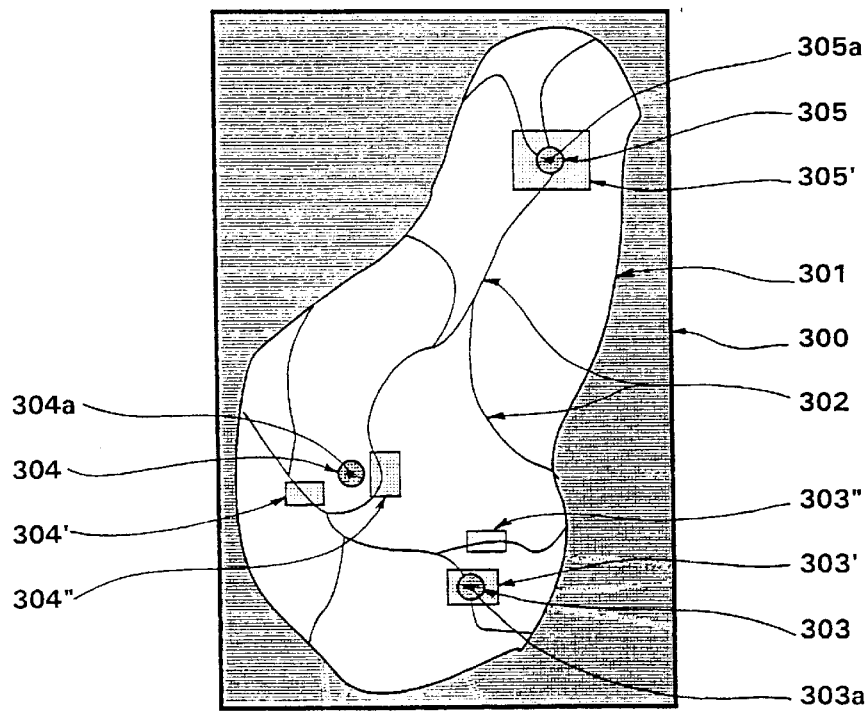

FIG. 5 illustrates an example of a geographical breakdown of a town in the context of a detailed presentation. The external rectangle 300 defines the approach zone of influence. Contour line 301 defines the site corresponding to a town, the lines 302 represent the roads inside the town site. The circles 303, 304 and 305 represent three sub-sites in the town site. The small rectangles 303', 303", 304', 304" and 305' constitute the zones of influence associated with the corresponding sub-sites 303, 304 and 305. Points 303a, 304a and 305a represent the real points associated with the corresponding sub-sites 303, 304 and 305.

In the multimedia animated sequences database 151, each site, sub-site or topic is associated with a set of multimedia animated sequences and a set of zones of influence. From the multimedia animated sequences selection unit 64 the user selects for each site, sub-site or topic, a sequence from the set of multimedia animated sequences relating to the site, topic or sub-site in question.

To prepare a journey, the personnel 25 in the travel agency 11 perform the following operations in accordance with the following flow charts:

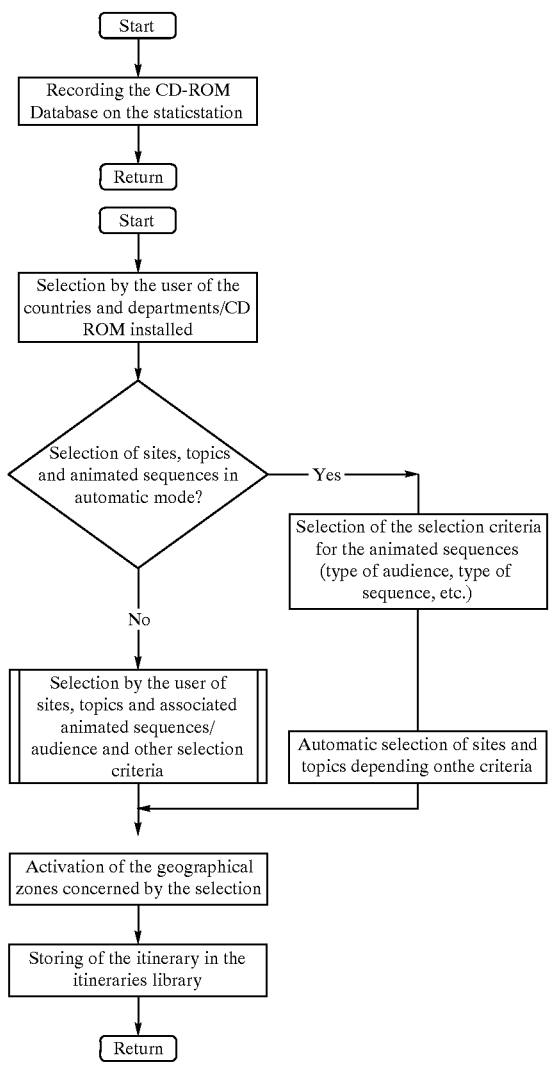

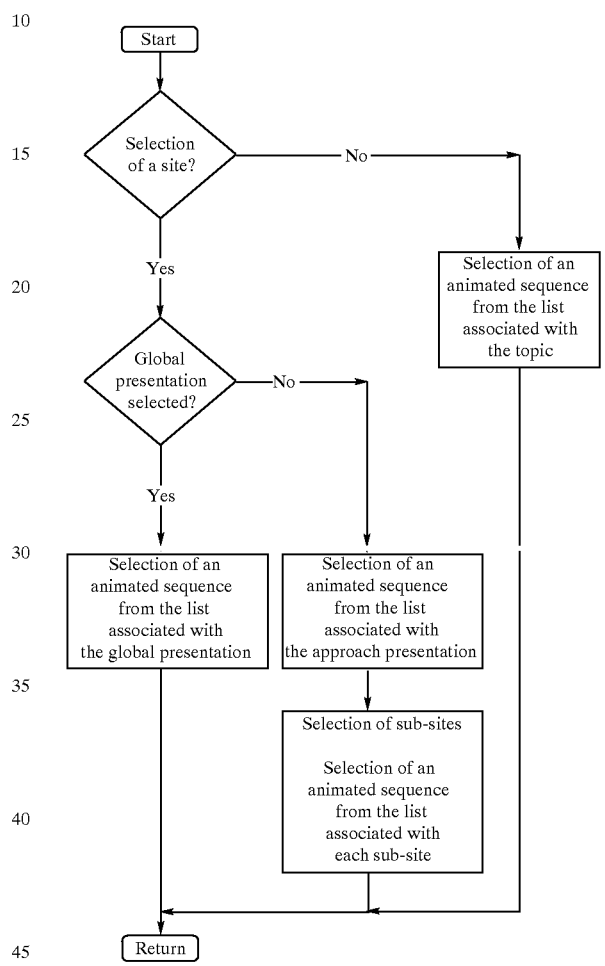

At the departure point the user installs the CD ROM(s) 151 containing the multimedia animated sequence database on the computer 12 on the static IT station 10 and copies at least part of the contents of the CD ROM(s) 151 into the multimedia database 152 of the computer. The user can then choose whether to select manually or automatically the animated sequences for the sites and topics to be distributed during the journey. First the user selects the countries and departments, available on the CD ROMs installed, which the vehicle is likely to travel through. In automatic mode, the user indicates the selection criteria for the animated sequences, such as the type of audience, event, etc. The sites and topics are selected automatically depending on the criteria. In manual mode, described below, the user selects, using the multimedia animated sequence selection unit 16, the sites and topics and the associated sequences depending on the audience and/or other criteria After selecting the animated sequences, the geographical zones of influence for the selection are activated. AU the zones of influence constitute an itinerary which is then stored in the itinerary library 17 such that it can be re-used and/or modified according to needs.

The following flow chart shows in greater detail the various phases necessary for selection of sites and topics in manual mode.

For a site, the user selects either a global presentation, or a detailed presentation. For a global presentation, the user selects an animated sequence from the relevant collection. For a detailed presentation, the user selects for the approach and for each sub-site, an animated sequence from the relevant collection for the approach and each sub-site. For a topic, the user selects an animated sequence from the collection relevant to the topic.

Then the user creates the customised messages using the customised messages creation unit 20 and the following flow chart Customised messages means for example, welcome messages, the day's programme, the day's menus, promotions for future excursions, etc.

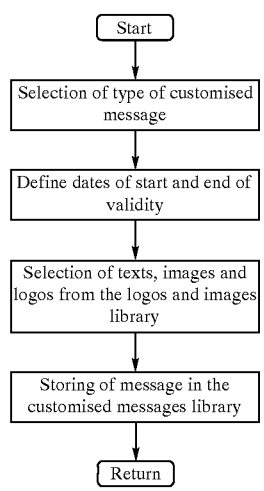

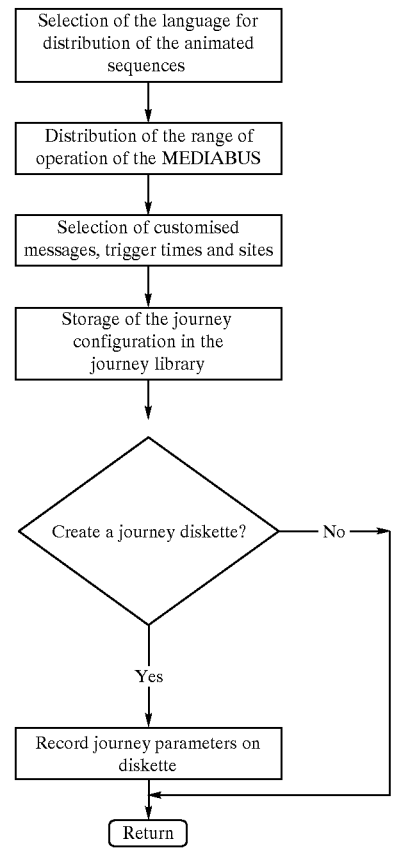

The user first of all defines the time data linked to the messages, such as the start and end of the period of validity of the messages. Then the user selects the text of the customised messages and the background images, logos etc. which may already be included in the existing libraries 21, 22 of images, logos or other items depending on the requirements. The user then stores the customised messages in the customised messages library 23 so as to re-use and/or modify them as necessary.

After carrying out the preparatory works, the user can organise the journey in accordance with the following flow chart:

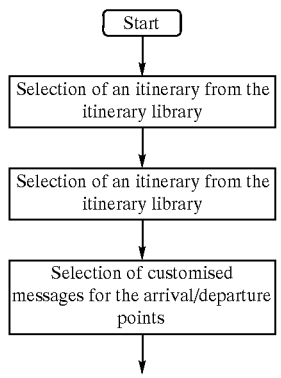

The user determines the journey parameter using the parametering unit 18 by selecting a journey itinerary from the itinerary library, selects the arrival/departure sites from the itinerary sites 17, selects the customised messages for the arrival/departure points from the messages library 23, selects the language for distribution of the multimedia animated sequences, defines the time band for operation of the Mediabus® equipment, selects the customised messages from the messages library 23 and defines the times and sites for triggering the said messages. After selecting all the parameters, the user stores them in the journeys library 19 so as to re-use and/or modify them depending on needs. A "journey diskette" 101 can then be created on which the journey parameters are recorded, so these can be transmitted to the on-board IT station 50.

The static IT station 10 also includes a test unit 24 allowing the user to test the contents of the journey in accordance with the following flowchart.

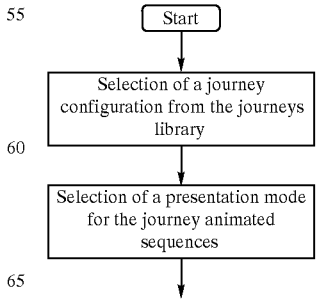

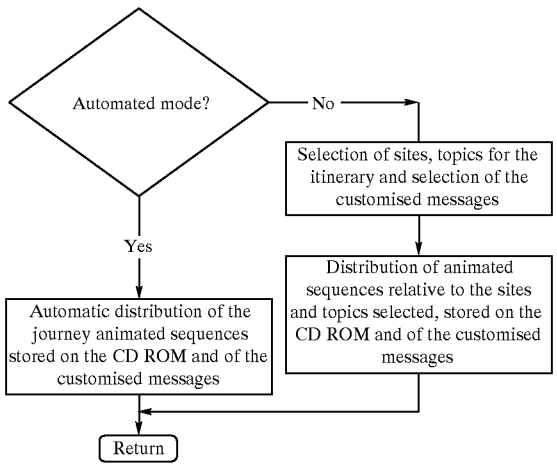

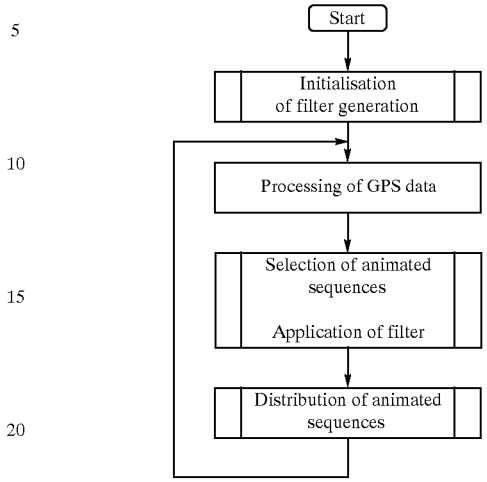

The user selects a journey from the journey library 19 and loads the static IT station 10 with the corresponding CD ROM 151. The user can then select either automatic or manual presentation mode for the journey animated sequences. In automatic mode, all the animated sequences are distributed automatically. In manual mode, the user can select distribution of the animated sequences depending on the sites or topics for the itinerary. The customised messages are also distributed simultaneously.

When departing for the journey, the driver 62 of the coach 51 inserts the "journey" diskette 101 and the corresponding CD ROM 151 in their respective drives 53, 54 on the on-board IT station 50. One the station has started up, the start-up unit 59 in the "journey management" module 58 acquires from the memory, the data on the "journey" diskette 101 and the CD ROM 151. The animated sequences management unit 64 checks the multimedia animated sequences are sent to the sequence distribution unit 55 depending on the data from the GPS receiver 201 and the journey parameters via the parameters management unit 61 by reading the database on the CD ROM 151. To send a sequence, the animated sequence management unit 64 copies the relevant contents of the CD ROM 151 to the animated sequences distribution unit 55. Moreover, the customised messages management unit 65 sends to the animated sequences distribution unit 55, the customised messages depending on the following parameters: date, time and/or place of distribution of the messages. The GPS data management unit 66 receives the data from the GPS receiver 201. It processes the data and sends the signals to the animated sequences management unit 64 and the customised messages management unit 65 for automated control of distribution of the corresponding animated sequences and customised messages. All these operations are detailed in the following flowcharts.

On start-up, there is an initialisation phase for the static IT station 50 and for acquisition of the journey parameters, detailed below. Then the geographical data received from the GPS receiver are processed by the relevant management unit 66, as well as the time data received from the internal clock of the IT station. Depending on the geographic and time data and the journey parameters, the animated sequences are selected by the animated sequences management unit 64, which is described later, then distributed on the distribution unit 55, which is also described later.

The GPS receiver continuously supplies at a frequency in the order of every second, the geographical data which are formatted in accordance with the following functional flowchart.

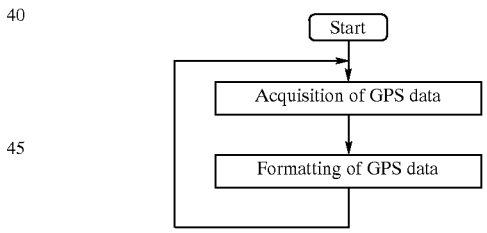

The initialisation and acquisition of journey parameters is detailed in the following flowchart.

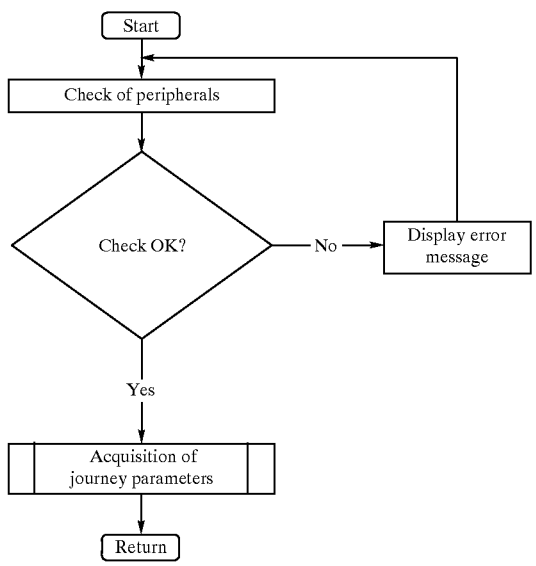

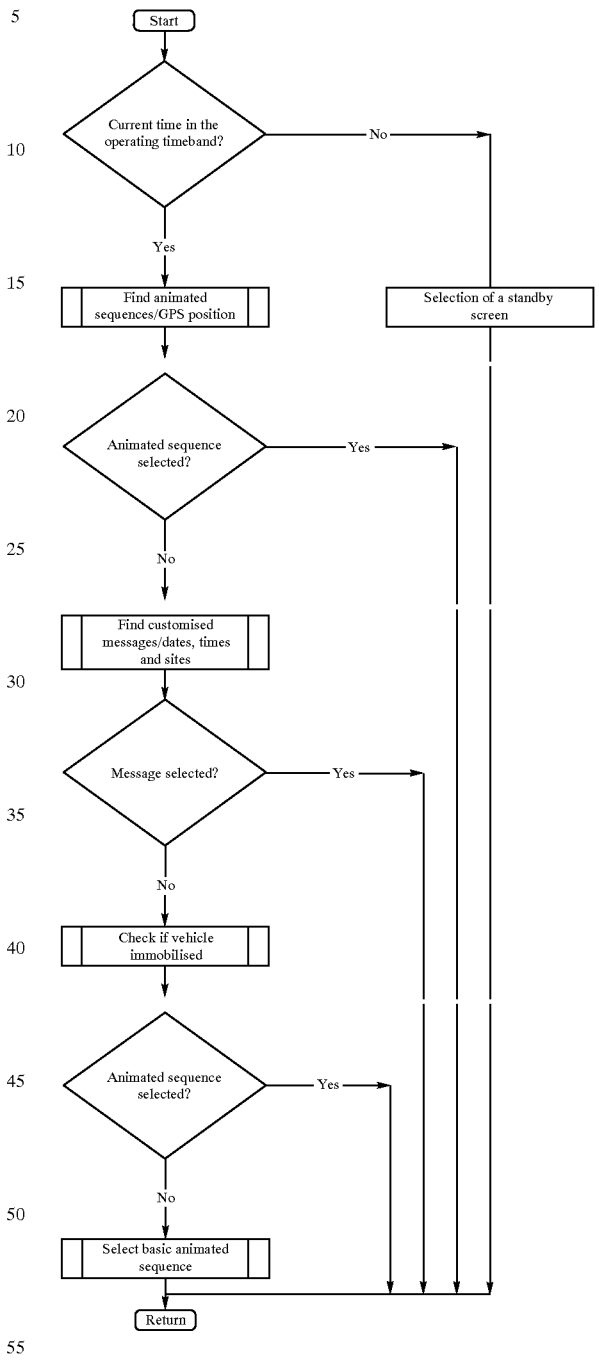

The procedure for selecting animated sequences by the sequence management unit 64 is represented in the following flowchart.

On departure, there is an automatic check of the on-board IT station 50 peripherals. In the event of any defects, an error message is displayed. Otherwise, acquisition of the journey parameters can occur in accordance with the following flowchart.

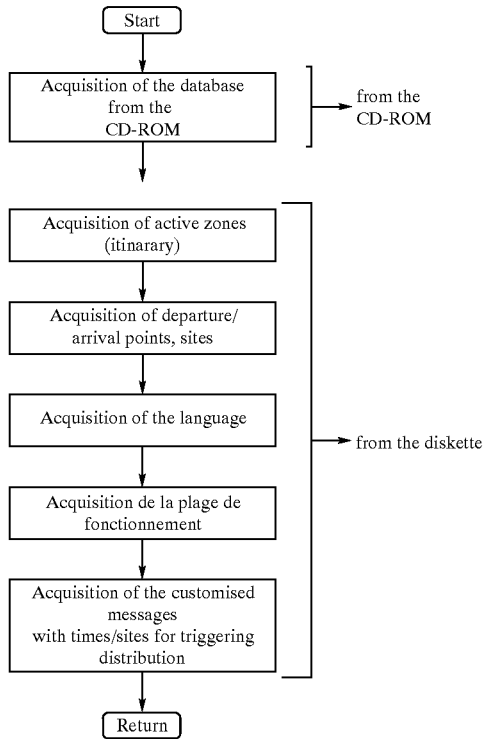

During an initial stage, the database containing the multimedia animated sequences is loaded from the CD-ROM 151 into the memory 60. The following are then loaded from the diskette 101 into the memory 60: the journey parameters such as the itinerary constituted by the active zones of influence, the departure/arrival points and sites, the language, the operating timeband, the customised messages and the trigger times.

If the actual time is not included in the operating timeband of the "Médiabus®" equipment, a standby screen is selected and displayed. If the current time is within the operating timeband the animated sequences are distributed in the following search order:

search for animated sequences depending on the geographical data from the GPS, as detailed below,
  search for customised messages depending on the time and/or geographical data, as detailed below,
  search for waiting animated sequences if the vehicle is immobilised, as detailed below.

If none of the above animated sequences is selected, then a basic sequence is selected as detailed below.

The order of searching for the animated sequences can be modified depending on the applications.

The search for animated sequences depending on the geographic data is detailed in the following flowchart.

If the vehicle enters an enabled zone of influence and if this zone is linked to a site or a sub-site, there will either be a detailed or a global presentation of the site. Assuming the site is the journey departure or arrival point, the corresponding selected animated sequence will be distributed. This test is described in detail later. In all cases, during the global or detailed presentation of a site or sub-site, the corresponding zones of influence are disabled to prevent repeat distribution of the same animated sequences. If the zone of influence through which the vehicle is travelling is not linked to a site or sub-site, but to a topic, the corresponding animated sequence is selected and the corresponding zones of influence are disabled. Otherwise, no animated sequence is selected.

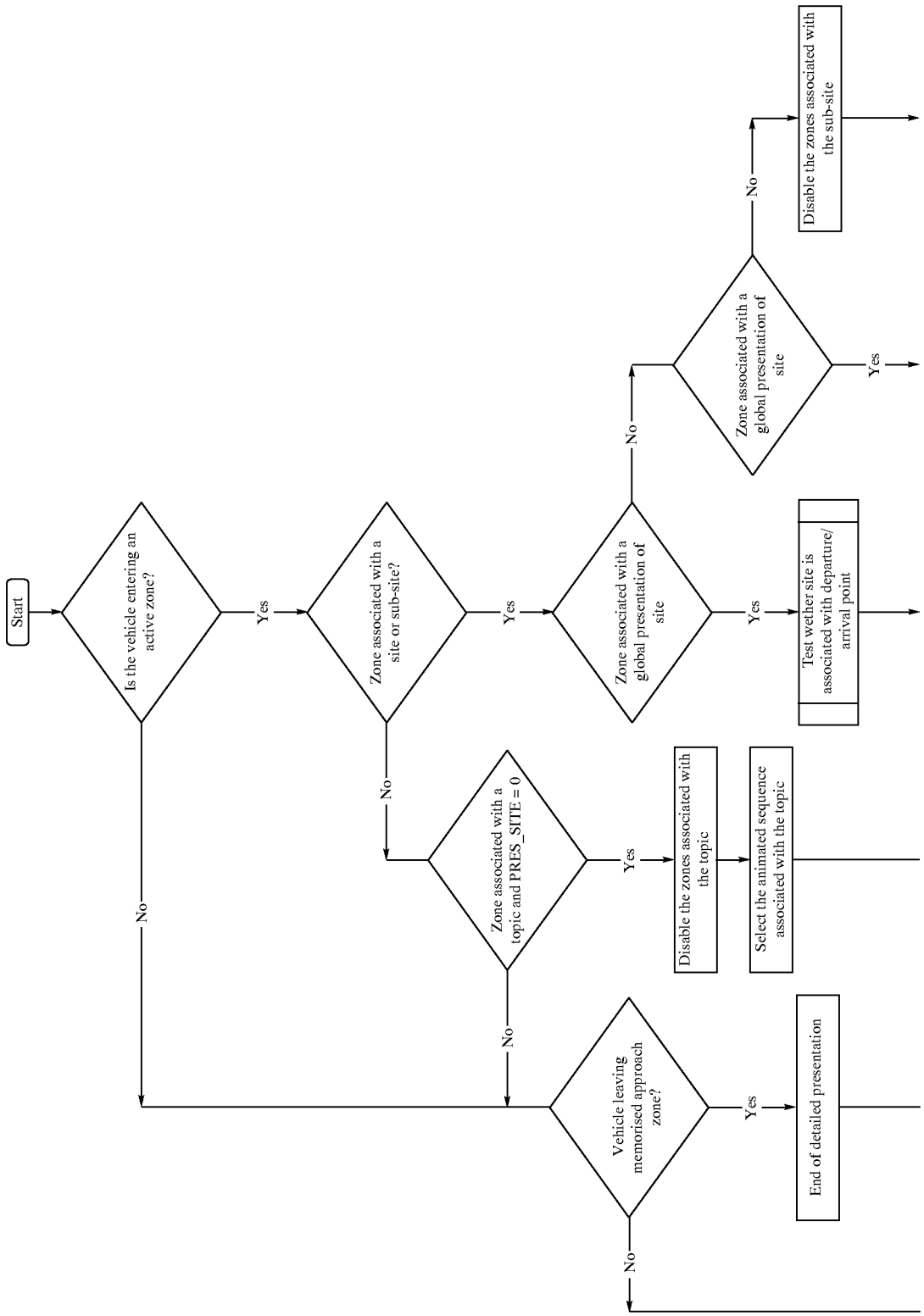

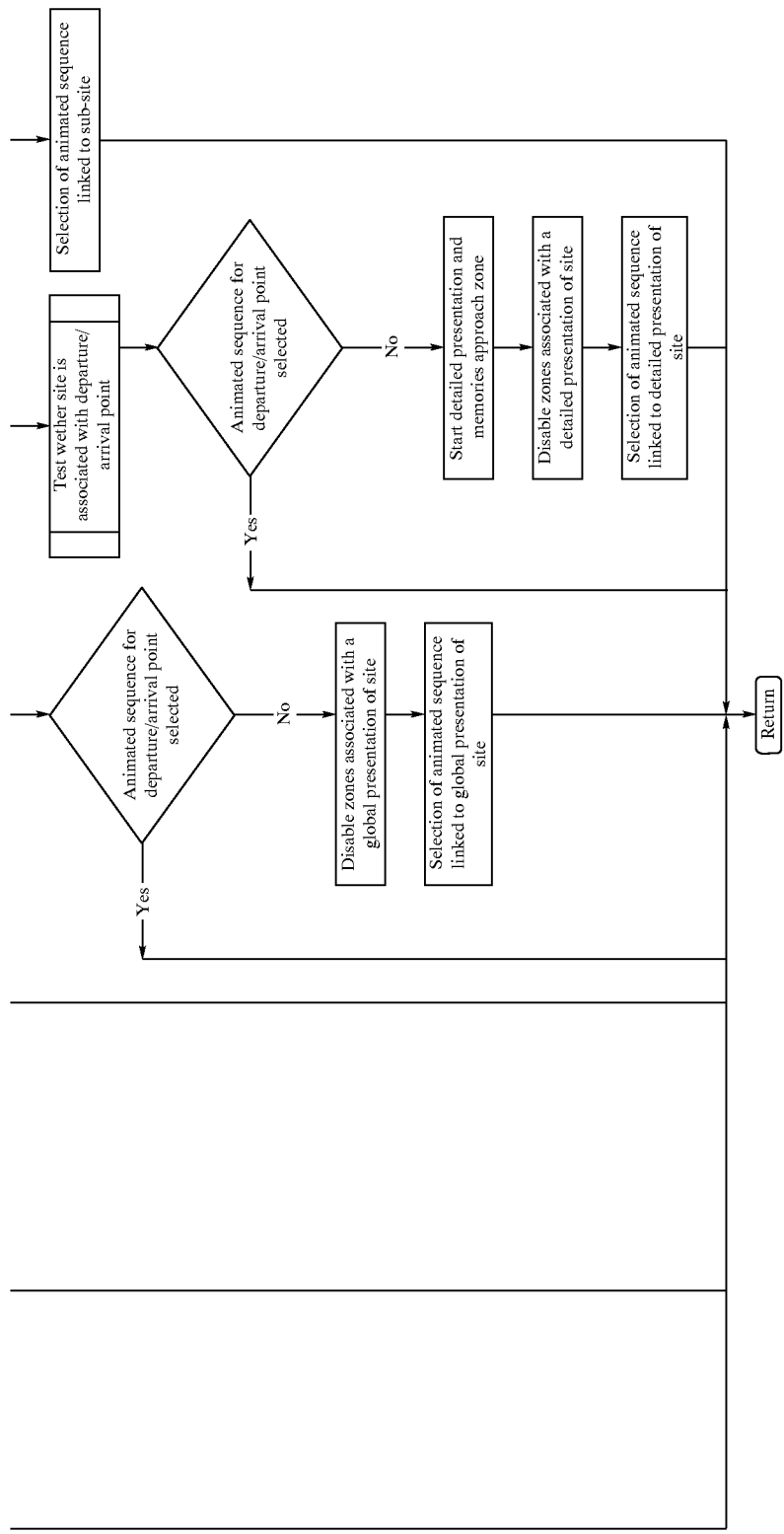

To test whether a site is linked to an arrival or departure point, the site is first compared with the departure point If there is a correspondence, detection of the departure point is disabled and the animated sequence linked to the departure point is selected. Otherwise, it is compared with the arrival point If there is a correspondence, detection of the arrival point is disabled and the animated sequence linked to the arrival point is selected. The applicable flowchart is shown above.

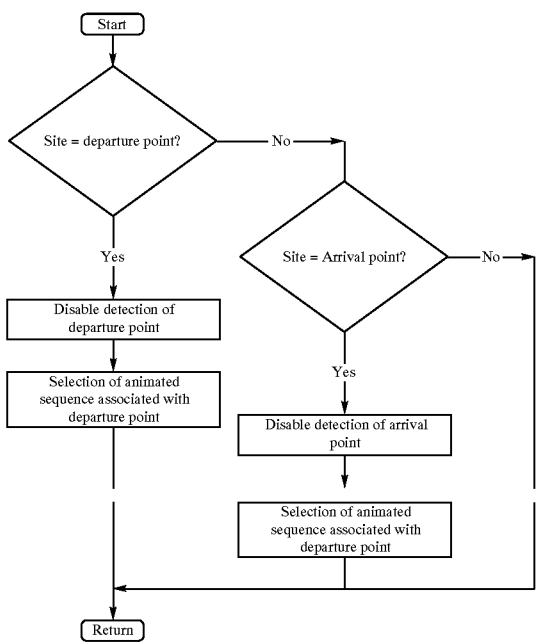

The search for customised messages depending on the time data is shown in the following flowchart.

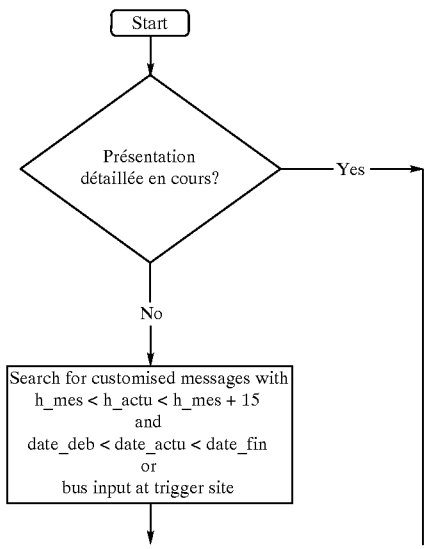

-continued

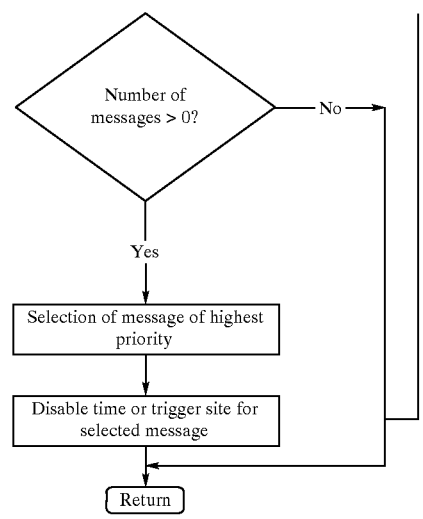

If no animated sequences are selected for a site and no detailed presentation is in progress, if the actual time corresponds to within 15 minutes of the trigger time of a customised message, and if the actual date corresponds to the date of validity of the said message, then the message is selected and its time of triggering is disabled. In the case where there are several messages, an order of priority is specified.

The search for waiting animated sequences if the vehicle is immobilised is shown in the flowchart above.

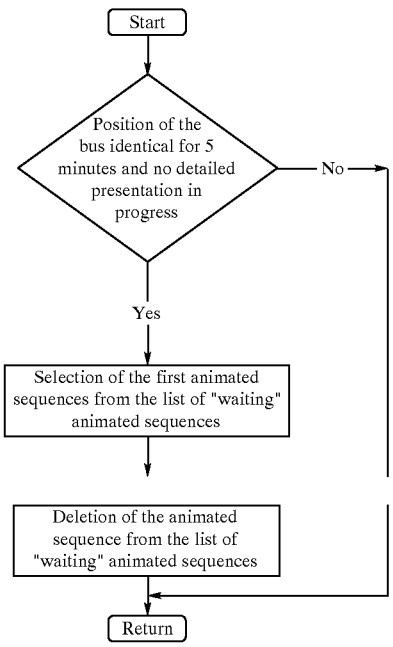

If the geographical position of the vehicle does not change during a pre-determined period, e.g. 5 minutes, and if no animated sequence for a site or sub-site is selected, then the first sequence from the list of waiting animated sequences is selected and then deleted from the list.

In the hypothesis where no animated sequence or message is in course of distribution, basic animated sequences such as a road map showing the vehicle moving in real time, or display of the vehicles speed or its altitude, etc. can be displayed. In general, these basic animated sequences last only a few minutes.

The distribution of the animated sequences is detailed in the following flowchart.

travels, including on sites which may not be visible from the vehicle. The multimedia databases on the CD ROMs are evolutive and can be defined to suit highly specific objectives, such as entertainment for children during educational journeys, applications customised for specific destinations, such as a vineyard route.

This invention is not however limited to the example of implementation and application described but extends to any modification, variation and/or obvious application to a professional.

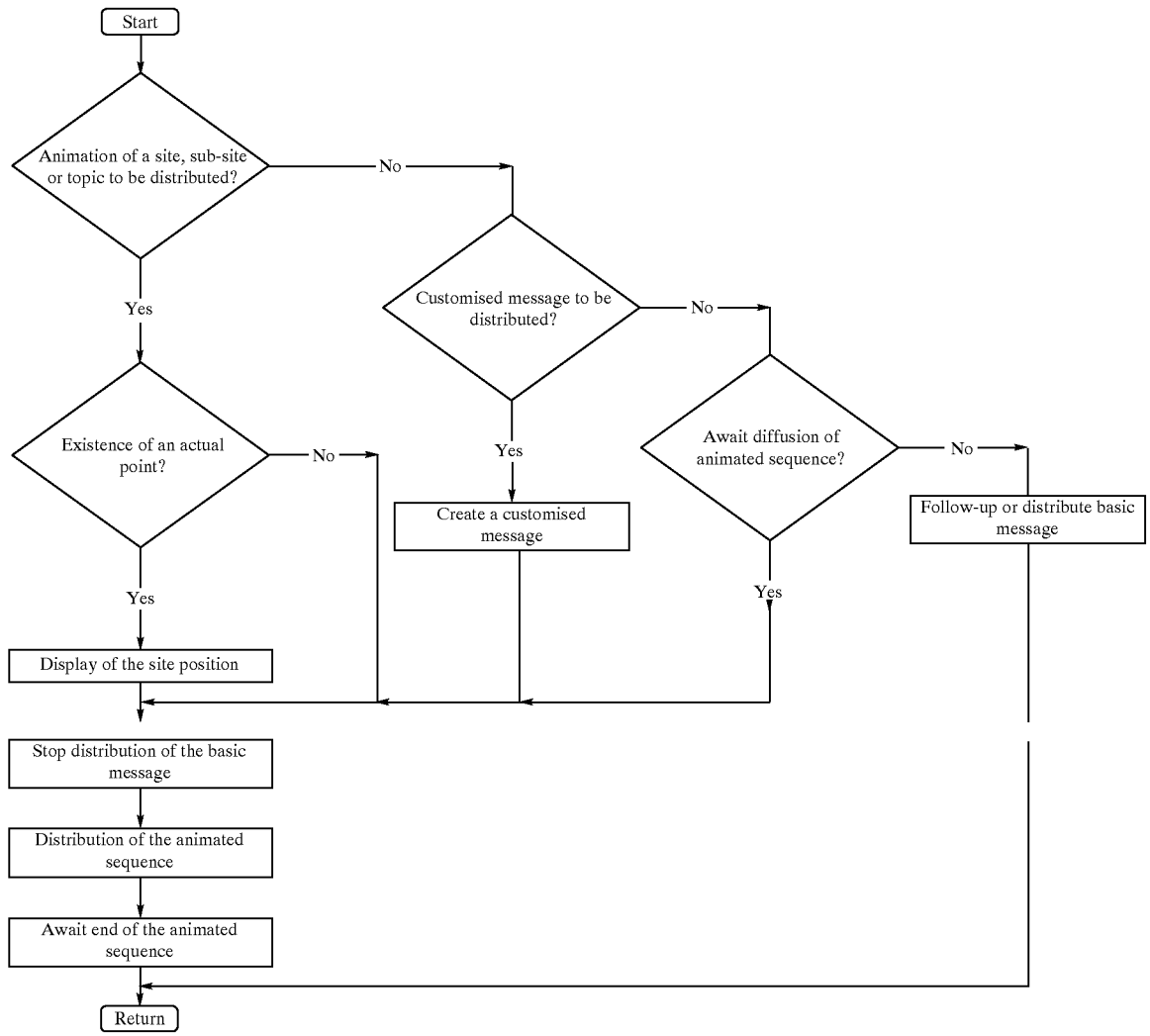

If an animated sequence concerning a site, a sub-site or a topic is to be distributed, then distribution of the basic animated sequence is interrupted. In the case of existence of a real point associated with the site, sub-site or topic, the corresponding position is displayed and the animated sequence is distributed in full by the distribution unit 55. If there is no animated sequence to be distributed, a customised message, a waiting animated sequence or a basic animated sequence is distributed in order of priority.

The above description clearly illustrates that the objectives of the invention are achieved. Since the animated sequences distributed are of the multimedia type, detailed, accurate, varied and highly attractive user-friendly information can be conveyed on the sites through which the vehicle For example, to remain in the framework of travel, the on-board IT station could be located in a tourism or cruise ship. The multimedia animated sequences distributed on for example, a tourism boat would concern e.g. the various monuments and areas visible from the boat and also other sites which were not visible but were illustrated by the said video multimedia animated sequences. Those distributed on a cruise ship would concern the countries, the coastlines, the continents and also the sea bottom. This example could obviously be extended to air and rail transport.

The invention could also be envisaged for use in connection with various sports for the distribution of multimedia animated sequences concerning the history of a sport, the biography of top sports people, the way of dealing with various sporting difficulties in relation to a given situation, etc. The example of golf allows illustrating this application. In this case, the golf car is equipped with an on-board IT station with a miniature GPS type receiver screen. Depending on the position of the player in relation to a hole, this station could give accurate information to help the player with his shot. This information on a compact disk with an appropriate database could, for example, be used to illustrate a player in a similar situation and his/her way of dealing with the shot. In this case, the static IT station and the data transmission disk are not mandatory given that the database on the compact disk would suffice.

Another example where the invention would be of considerable interest concerns group visits of factories, major industries, complexes and even museums or other public amenities. Taking into account the movements of the group, most visitors do not hear the explanations of the guide, In other cases, no explanations are provided, whereas some basic information would in fact be much appreciated. CD ROMS could be made for each specific application containing a maximum of useful information on the topic concerned. The on-board IT stations could be adapted and miniaturised depending on the vehicle. They could possibly be portable and carried by the pedestrian. The location of the vehicle or the user would achieved using a GPS type receiver or another system depending on the application envisaged. The multimedia animated sequences on the compact disk would then correspond automatically to the location of the vehicle or user.

These non exhaustive examples of applications clearly illustrate the multiple possibilities offered by this invention.

What is claimed is:

1. An information technology equipment (1) of a multimedia type for the automatic distribution of multimedia animated sequences depending on at least one of a geographical position, a defined time and a specified date carried on-board a vehicle (51), for the distribution of tourist multimedia animated sequences in the framework of an excursion on-board the vehicle, the equipment including at least one on-board IT station (50) installed in the vehicle, the on-board IT station (50) incorporating at least one resource for storing the multimedia animated sequences (150), at least one unit for management of the multimedia animated sequences (64), at least one distribution unit (55) for said multimedia animated sequences, at least one resource for automatic location (200) of the vehicle (51), these resources incorporating a GPS type receiver (201) on-board the vehicle (51) equipped continuously to supply geographical data concerning a position of the vehicle and at least one time detection resource incorporating a clock equipped to supply time data in a continuous fashion, and such geographical data and time data being formatted for communication with the management unit (64) so as to distribute the appropriate multimedia animated sequences depending on the geographical position of the vehicle (51) and the time and the date, the animated sequences distribution unit (55) being linked to at least one television screen (56) and at least one loudspeaker (57) installed in the said vehicle (51), wherein the on-board station (50) incorporates resources to store journey parameters (101) distinct from the resources for storage of the multimedia animated sequences and which contains information on the programmed journey itinerary and on interests and types of passengers anticipated, these storage units for the journey parameters are prepared in a static IT station, and the on-board station also incorporating a journey parameter management unit (61) which communicates with the multimedia-animated sequences management unit (64) so as to send the animated sequences to the unit distributing the sequences (55) depending, in additions on the journey parameters.

2. The equipment as in claim 1, wherein the on-board station incorporates a memory (60) in which the database, the animated sequences and journey parameters are loaded from the corresponding storage devices (150, 101).

3. The equipment as in claim 1, wherein the equipment incorporates a static IT station (10) incorporating at least resources for storing the multimedia animated sequences (150), at least one unit for selection of the multimedia animated sequences (16) and at least one parametering unit (18) for the journey and incorporating transmission resources (100) to send the data to the on-board IT station (50).

4. The equipment as in claim 3, wherein the static (10) and on-board (50) IT stations include a computer (12, 52) of the multimedia type equipped with an optical reader (14, 54) and storage resources for the multimedia animated sequences (150) includes at least one CD ROM (151) containing at least one multimedia data base corresponding to the animated sequences to be distributed.

5. The equipment as in claim 3, wherein the unit for selection of the multimedia animated sequences (16) is equipped to select the animated sequences to be distributed from the storage resources for the multimedia animated sequences (150) depending on the journey itinerary selected and one of the audience and a specific topic.

6. The equipment as in claim 5, wherein the parametering unit (18) of the journey is equipped to define the journey parameters, the parameters incorporating at least one itinerary linked to the multimedia animated sequences selected from the selection unit (16) and the item data.

7. The equipment as in claim 6, wherein the static IT station (10) incorporates a customized message creation unit (20), and the fact that the customized messages are linked to a parametering unit (18) and are transmitted to the on-board IT station (50) using the said transmission resources (100) and the on-board IT station (50) incorporates a customized passages management unit (65).

8. The equipment as in claim 7, wherein the customized messages management unit (65) is equipped to send the customized messages to the animated sequence distribution unit depending on at least one of the geographical and time data and depending on the journey parameters.

9. The equipment as in claim 7, wherein the static IT station (10) includes libraries (17, 19, 23) equipped to store respectively, itineraries created by the animated sequences selection unit (16), journeys created by the parametering unit (18) and the customized messages created by the message creation unit (20).

10. The equipment as in claim 7, wherein the animated sequences management unit (64) and the customized messages management unit (65) are equipped to find at least one of the animated sequences and the messages to be distributed depending on an order of priority defined by the journey parameters.

11. The equipment as in claim 3, wherein the static IT station (10) includes at least one journey test unit (24) equipped to display the selected journey parameters and the corresponding animated sequences.

12. The equipment as in claim 3, wherein the transmission resources (100) incorporate a diskette ((101) and that the fixed (10) and on-board (50) IT stations incorporate a disk drive (13, 53).

13. The equipment as in claim 3, wherein the transmission resources (100) incorporate a radio transmitter and that the on-board IT station (50) incorporates a radio receiver.

14. The equipment as in claim 3, wherein the transmission resources (100) incorporate a telephone modem and in that the on-board IT station (50) incorporates an equivalent modem.

15. The equipment as in claim 1, wherein the animated sequences management unit (64) is equipped to send waiting animated sequences, if the geographical data supplied by the GPS type receiver (201) does not change during a predefined period specified in the journey parameters.

\* \* \* \* \*